United States Patent [19]

Kong

[11] Patent Number: 5,291,263
[45] Date of Patent: Mar. 1, 1994

[54] LASER RANGE FINDER USING A NONLINEAR CRYSTAL

[75] Inventor: Hong J. Kong, Taejon, Rep. of Korea

[73] Assignee: Korea Advanced Institute of Science and Technology, Taejon, Rep. of Korea

[21] Appl. No.: 986,572

[22] Filed: Dec. 7, 1992

[30] Foreign Application Priority Data

Mar. 18, 1992 [KR] Rep. of Korea ............ 4413/92

[51] Int. Cl.⁵ ............... G01C 3/08; G01B 11/26
[52] U.S. Cl. .................. 356/5; 356/152/153
[58] Field of Search ............. 356/5, 28.5, 141, 153, 356/152

[56] References Cited

U.S. PATENT DOCUMENTS

| | | | |
|---|---|---|---|
| 4,091,412 | 4/1978 | Salonimer | 356/5 |
| 4,198,162 | 4/1980 | Bjorklund et al. | 356/28.5 |
| 4,413,905 | 11/1983 | Holzapfel | 356/5 |
| 4,690,550 | 9/1987 | Kühne | |
| 4,812,639 | 3/1989 | Byren et al. | 356/152 |
| 5,006,813 | 4/1991 | Khoshnevisan et al. | 356/5 |

FOREIGN PATENT DOCUMENTS

| | | |
|---|---|---|
| 2405186 | 8/1974 | Fed. Rep. of Germany . |
| 2502662 | 8/1975 | Fed. Rep. of Germany . |
| 2536910 | 2/1977 | Fed. Rep. of Germany . |
| 2536956 | 2/1977 | Fed. Rep. of Germany . |
| 3310055 | 12/1983 | Fed. Rep. of Germany . |
| 3927157 | 12/1990 | Fed. Rep. of Germany . |
| 3930912 | 3/1991 | Fed. Rep. of Germany . |
| 298610 | 3/1992 | German Democratic Rep. . |
| 1543225 A1 | 2/1990 | U.S.S.R. . |

OTHER PUBLICATIONS

J. Ruger, "Eye Safe Raman Laser Range Finder for Ground and Airborne Application", Controller HMSO, London, 1986, pp. 13/1–9.

Y. Shen, "The Principles of Nonlinear Optics", chap. 7, John Wiley & Sons, 1984.

M. Zorgno, "High Performance Military Laser Range Finder," Electro-optics/Laser International '82 U.K. Conference, pp. 209–215.

Primary Examiner—Stephen C. Buczinski
Attorney, Agent, or Firm—Burns, Doane, Swecker & Mathis

[57] ABSTRACT

A laser range finder has a nonlinear crystal. The nonlinear crystal is disposed between a first and a second lens of between an infrared laser source and a second beam splitter. The laser range finder utilizes harmonic generation and is stable against a vibration and/or a shock.

3 Claims, 2 Drawing Sheets

LASER RANGE FINDER USING A NONLINEAR CRYSTAL

BACKGROUND OF THE INVENTION

1. Field of the Invention

This invention relates to a laser range finder, and more particularly, to a laser range finder which measures the range of a target by measuring the time it takes for a laser light to be reflected from the target.

2. Description of the Prior Art

The structure of a typically conventional laser range finder is shown in FIG. 1 which has been presented herein for the purpose of distinguishing the improvement in the invention in detail. The conventional laser range finder is designed so as to employ two light sources, namely, a light emitting diode (LED 30) for collimating a target, and an infrared ray laser 10 to measure the distance between the target and the viewer's eye.

The light emitted from the LED 30 is converted to parallel light and then reflected on a third beam splitter 12, followed by an expansion through a beam expander composed of a first lens 14 and a second lens 16.

Thereafter, the light passes through a first beam splitter 18 and is then reflected on a corner cube 20. The light thus reflected is then retro-reflected by the splitter 18 and entered, via a telescope 24, the viewer's eye 26.

A front surface 18A of the first beam splitter 18 is coated with a dielectric material so that the surface 18A can induce a full reflection by the infrared ray and a partial reflection by the visible light. A rear surface 18B of the splitter 18 is anti-reflection coated for visible light. Since the beam splitter 18 is inclined at a 45° angle to the optical axis, the light emitted from the laser 10 is reflected on the first beam splitter 18 and directed toward a target 22. Then, after the light is reflected from the target 22, it is reflected on a second beam splitter 32 and then entered into a detector 34.

With the conventional laser range finder as described hereinabove, it is possible to measure an accurate distance only when the positions of the third lens 28 and the third beam splitter 12 are constantly maintained. However, the conventional laser range finder has the disadvantage that when the positions of the third lens 28 and/or the third beam splitter 12 are altered and shifted during moving, or due to a vibration and/or a shock, the traveling direction of the light of the LED differs from that of the laser resulting in the occurrence of errors in the measurement of the distance; thus, it is difficult to obtain an accurate measurement of the distance.

SUMMARY OF THE INVENTION

Therefore, the object of the present invention is to provide a nonlinear crystal which acts as an infrared-to-visible converter (IVC) which eliminates the problem encountered in the conventional laser range finders.

Another object of the present invention is to provide a laser range finder equipped with a nonlinear crystal which is stable against vibrations or shocks.

These objects and other advantages can be achieved by the invention which comprises interposing a nonlinear crystal between first and second lenses of the conventional laser range finder as shown in FIG. 1 and described hereinabove.

BRIEF DESCRIPTION OF THE DRAWINGS

The present invention will be best understood from the following non-limiting description of the invention with reference to the accompanying drawings, in which.

DESCRIPTION OF THE PREFERRED EMBODIMENT

Figure 1:
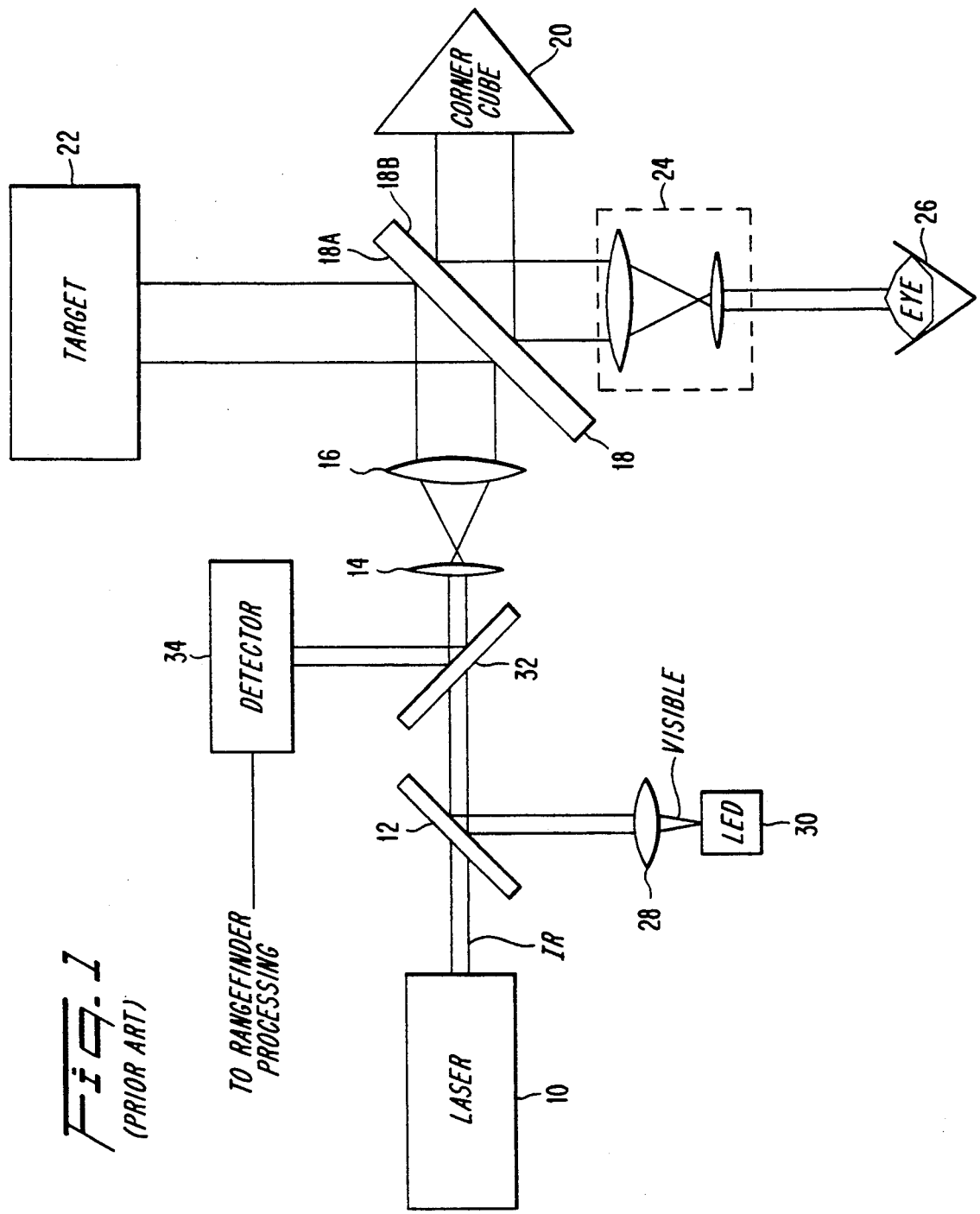
FIG. 1 is a block diagram illustrating the structure of a typically conventional laser range finder.
Figure 2:
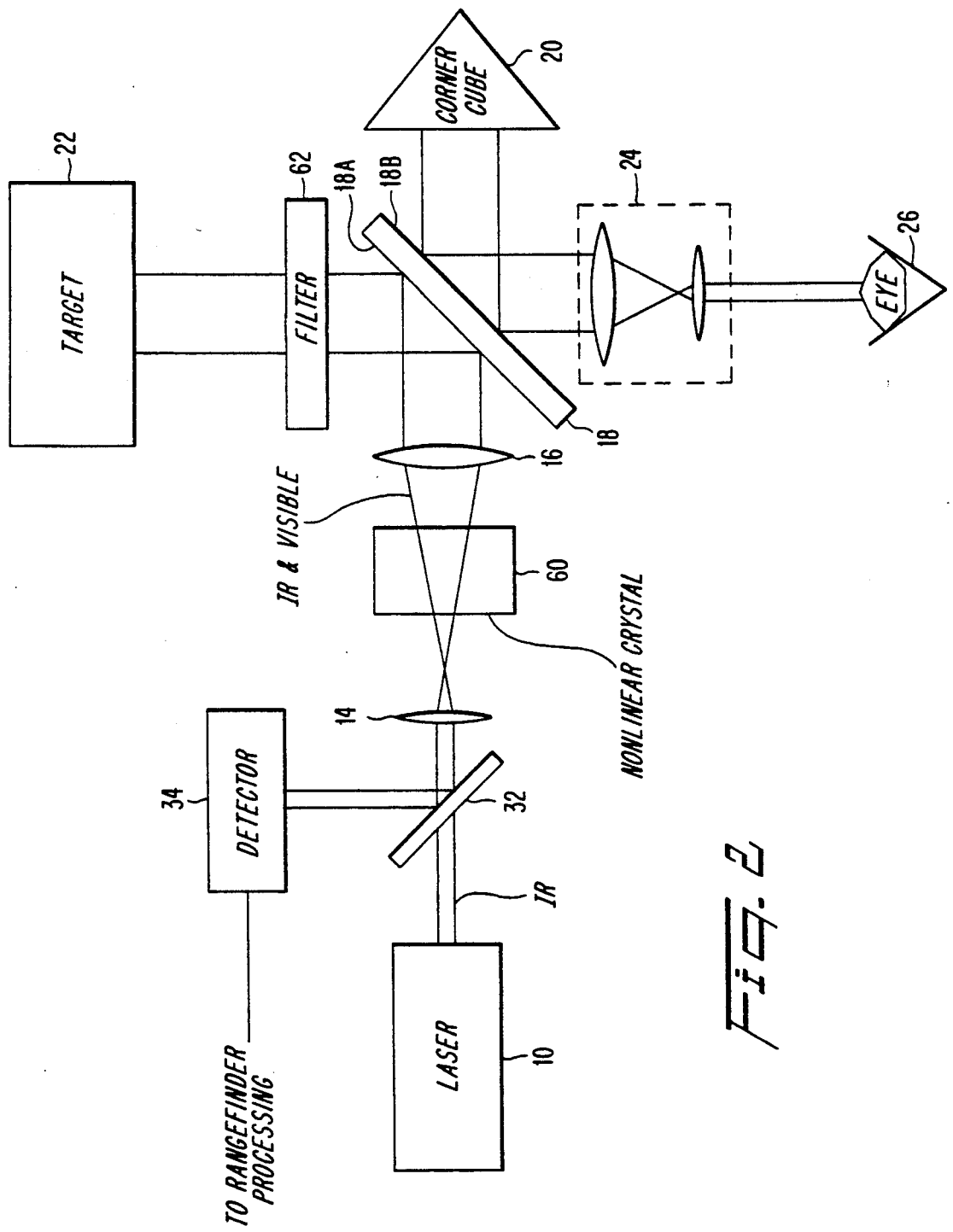
FIG. 2 is a block diagram illustrating the preferred embodiment of the structure of the laser range finder according to the invention.

In FIG. 2, the same elements as those shown in FIG. 1 are denoted with the same reference numerals and, thus, no further explanation thereof will be required.

Referring now to FIG. 2, it will be noted that in order to eliminate the prior art disadvantages, the laser range finder according to the present invention employs a nonlinear crystal 60 and a filter 62 instead of third lens 28, third beam splitter 12, and LED 30 as shown in FIG. 1. The fundamental concept of the above nonlinear crystal is described in Y. R. Shen, "The Principles of Nonlinear Optics," Chapter 7, John Wiley & Sons 1984, and is incorporated by reference into the present invention. This nonlinear crystal converts the infrared laser beam into visible light.

Also shown in FIG. 2, are a laser source 10, a first lens 14, a second lens 16, a first beam splitter 18, a telescope 24, and a detector 34. In the structure according to the present invention as mentioned above, the laser 10, the second beam splitter 32, the first lens 14, the second lens 16, and the first beam splitter 18 are disposed in a series on a straight line. Therefore, when the intense infrared ray generated from the laser source 10 is incident on the nonlinear crystal 60 positioned integrally between the first lens 14 and the second lens 16, satisfying the phase matching condition, a part of the light is converted into and emitted as visible light by the harmonic wave generation. This gives rise to an advantageous phenomenon, namely, the direction of the infrared light is in accord with that of the visible light. The application of this phenomenon to the laser range finder further gives rise to other advantages such as having the direction of target collimation exactly agree with the forward direction of the infrared laser light. Further, the entire system is stable, despite vibration or shock, because the diverging beam enters into the crystal in which stable conversion of the infrared ray light into the visible light occurs even if the the crystal is disturbed.

Preferably, the conversion efficiency of the infrared-to-visible converter (IVC) should be small in order to protect the viewer's eye, and a filter 62 is optionally disposed between the first beam splitter 18 and the target 22 in order to cut the visible light.

Although the invention has been described with reference to the most prominent features of its embodiments, it should be noted that this description is not limited thereto and that various modifications of the disclosed embodiments will be apparent to those skilled in the art. It is, therefore, contemplated that the appended claims will cover all modifications that fall within the true scope of the invention.

What we claim is:

1. In a laser range finder, an apparatus comprising:

an infrared ray laser source for emitting a ray of infrared light along a first direction of an optical axis, the optical axis having opposing first and second directions;

a beam expander having opposing first and second sides, and disposed along the optical axis to receive, at the first side, a beam of light travelling in the first direction along the optical axis and at least partially including the ray of infrared light emanating from the infrared ray laser source, the beam expander emitting, from the second side, an expanded beam of light in the first direction along the optical axis, the beam expander comprising a first lens disposed at the first side, and a second lens disposed at a second side, wherein the first and second lenses are disposed along the optical axis and oriented with respect to one another so as to expand the beam of light travelling successively through the first and second lenses;

a first beam splitter, having opposing front and rear surfaces, the front surface being coated with a material that fully reflects infrared light and only partially reflects visible light, the rear surface not reflecting visible light, the first beam splitter being disposed along the optical axis to receive, at the front surface, the expanded beam of light travelling in the first direction, the first beam splitter being oriented at an angle with respect to the optical axis such that an infrared light beam contained within the expanded beam of light will be reflected toward a potential target;

a retro-reflector disposed along the optical axis and oriented so as to receive a visible ray of light travelling in the first direction along the optical axis and partially passing successively through the front and rear surfaces of the first beam splitter, the retro-reflector then reflecting the visible ray of light back toward the rear surface of the first beam splitter in the second direction along the optical axis;

a telescope disposed to receive the visible ray of light after the visible ray of light has successively been first reflected by the retro-reflector and then at least partially reflected by the first beam splitter;

a second beam splitter having a front surface coated with a material that only partially reflects infrared light, the second beam splitter being disposed along the optical axis between the infrared ray laser source and the beam expander to receive a returning ray of infrared light travelling in the second direction along the optical axis, the second beam splitter being oriented at an angle with respect to the optical axis such that the second beam splitter will at least partially reflect the returning ray of infrared light toward a detector; and a nonlinear crystal disposed along the optical axis between the infrared ray laser source and the first beam splitter for intercepting the ray of infrared light travelling in the first direction, and converting a portion thereof into visible light also travelling in the first direction along the optical axis, whereby the expanded beam of light comprises both infrared and visible light by the time it reaches the first beam splitter.

2. An apparatus according to claim 1, wherein the nonlinear crystal is further disposed between the first lens and the second lens.

3. An apparatus according to claim 1, wherein the nonlinear crystal is further disposed between the infrared ray laser source and the second beam splitter.

* * * * *